(12) United States Patent
Harbin et al.

(10) Patent No.: US 6,241,443 B1
(45) Date of Patent: Jun. 5, 2001

(54) FASTENER WITH STAGED LOCKING SYSTEM

(75) Inventors: Thomas Harbin, Westminster, CA (US); Robert J. Corbett, Crawford, TX (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 09/313,386

(22) Filed: May 18, 1999

(51) Int. Cl.$^7$ .................................................. F16B 19/00
(52) U.S. Cl. ............................................ 411/360; 411/339
(58) Field of Search ................................ 411/43, 45, 46, 411/360, 361, 338, 339, 34

(56) References Cited

U.S. PATENT DOCUMENTS

| | | |
|---|---|---|
| 3,277,771 | 10/1966 | Reynolds . |
| 3,515,419 | * 6/1970 | Baugh ................................. 411/339 |
| 4,127,435 | 11/1978 | Angelosanto et al. . |
| 4,405,273 | 9/1983 | Ruhl et al. . |
| 4,473,914 | 10/1984 | Haft . |
| 4,609,317 | 9/1986 | Dixon et al. . |
| 4,615,655 | 10/1986 | Dixon . |
| 4,635,310 | 1/1987 | Kendall . |
| 4,863,325 | 9/1989 | Smith . |
| 5,054,977 | 10/1991 | Schultz . |
| 5,228,817 | * 7/1993 | Cosenza ................................ 411/361 |
| 5,562,379 | * 10/1996 | Rausch ................................ 411/361 |
| 5,810,530 | 9/1998 | Travis . |

* cited by examiner

*Primary Examiner*—Gary W. Estremsky
(74) *Attorney, Agent, or Firm*—Harness Dickey & Pierce P.L.C.

(57) ABSTRACT

A fastener includes a pin and a collar for engaging the pin. The pin includes a pin head for engaging one exposed surface of the workpieces and a pin shank for positioning through a bore in the workpieces. The pin shank includes a second working second working edge, a second locking groove, a first working edge, a first locking groove, a breakneck groove and a pin tail having a plurality of pulling grooves. The collar includes an enlarged head and a through bore. The collar is placed over the pin shank and an installation tool is used to grip the pulling grooves. The installation tool forces the presses the collar onto the pin. As this happens, the first working edge engages the through bore of the collar and moves material from the through bore into the first locking groove to create a lock between the collar and the pin. Continued movement of the collar with respect to the pin engages the second working edge with the through bore of the collar and moves material from the through bore into the second locking groove to create an additional lock between the collar and the pin.

60 Claims, 4 Drawing Sheets

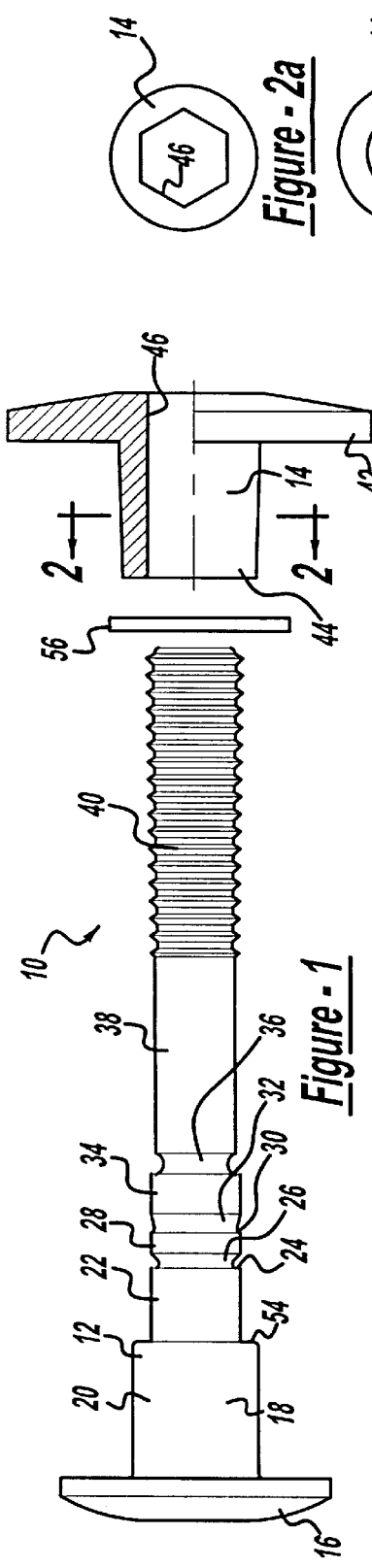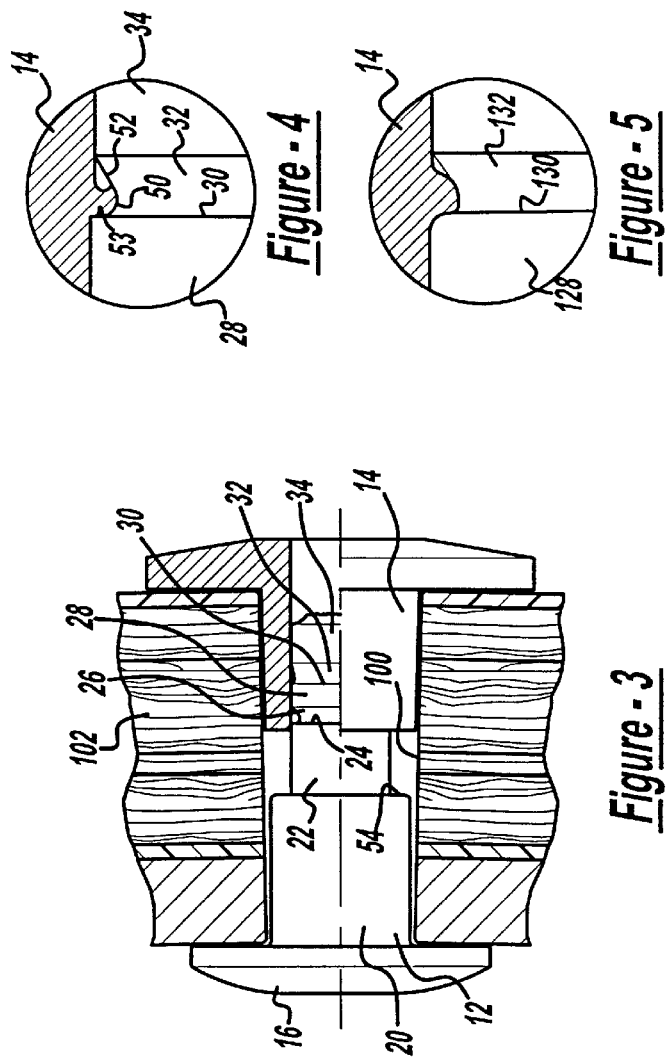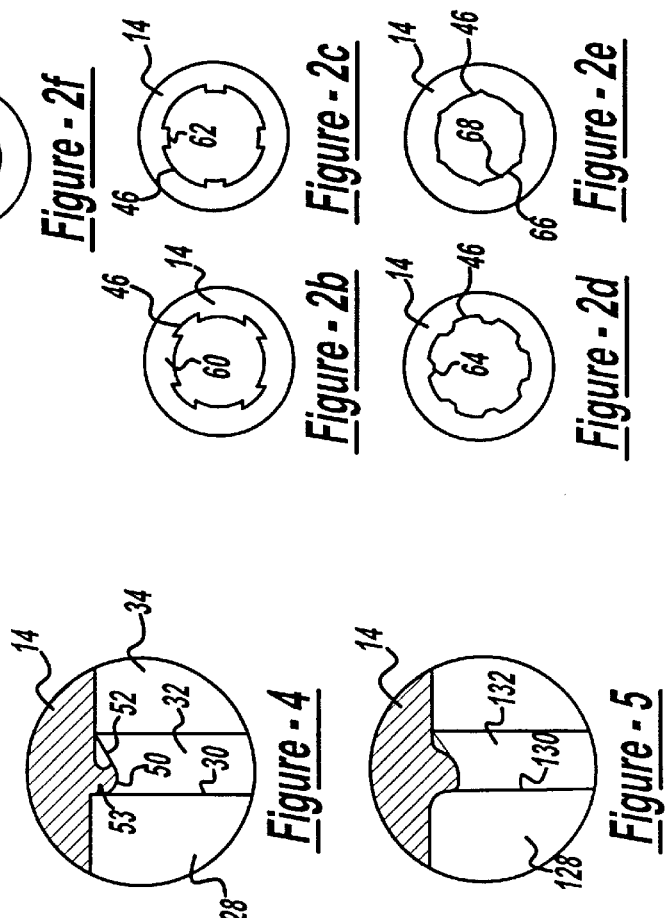

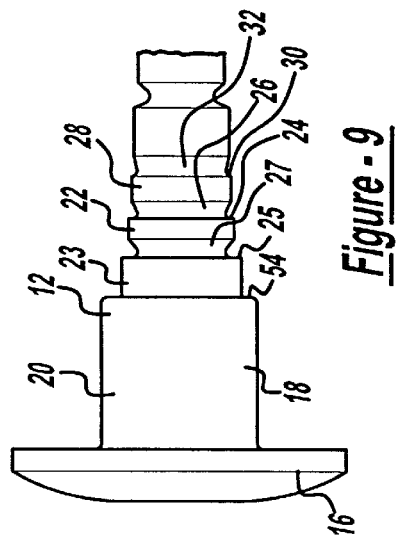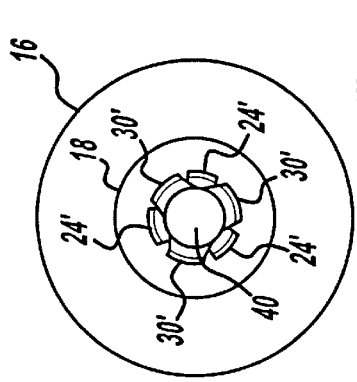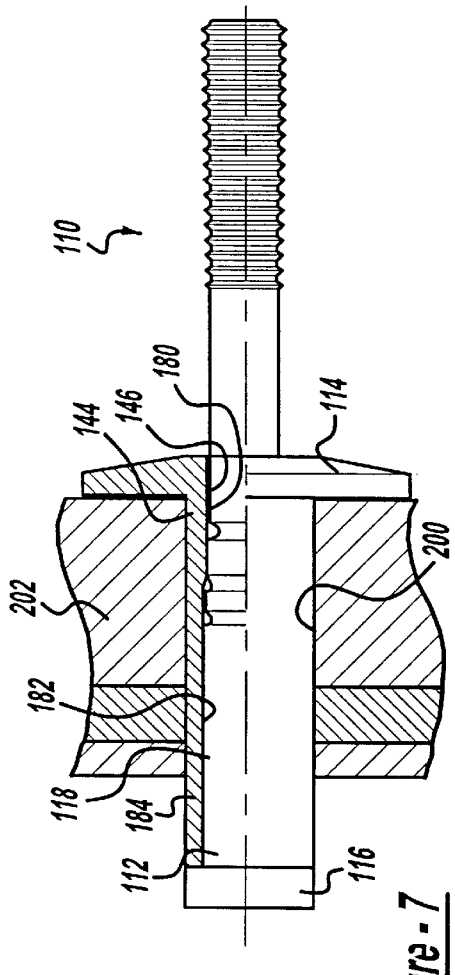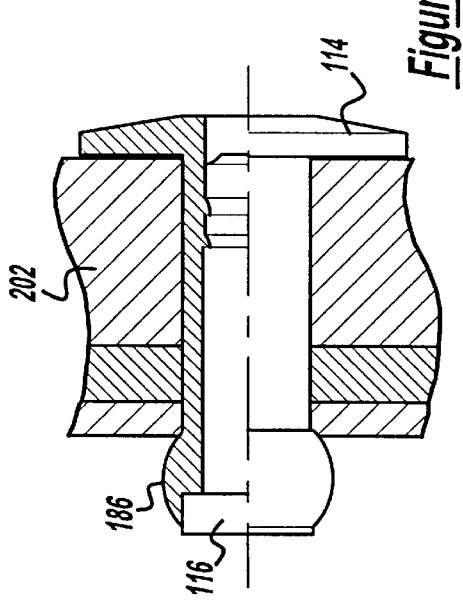

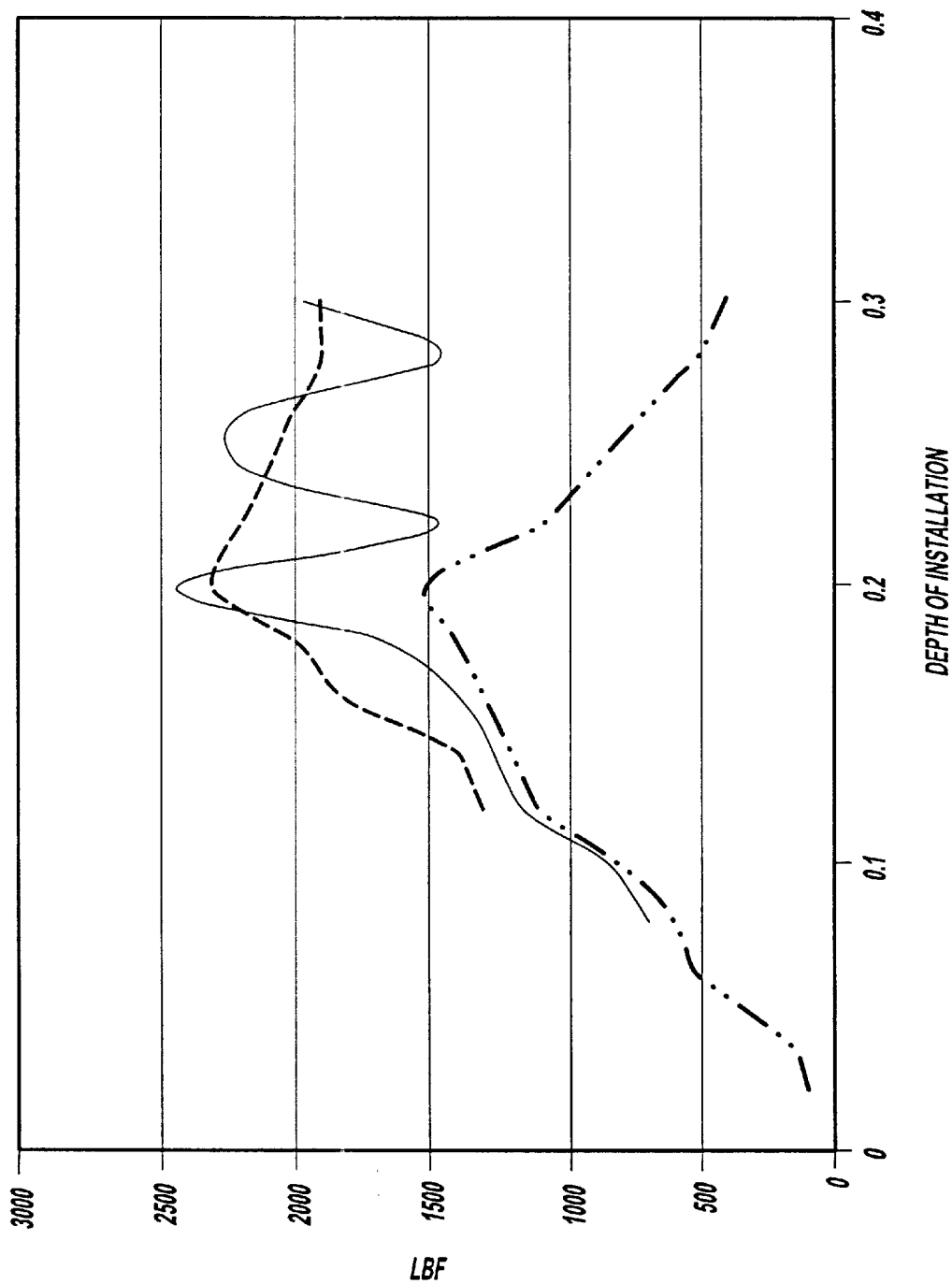

FASTENER WITH STAGED LOCKING SYSTEM

BACKGROUND OF THE INVENTION

The present invention relates to a fastener for securing workpieces together and more particularly to a multiple piece fastener including a pin and a collar.

One example of such a fastener can be seen in U.S. Pat. No. 4,846,611, "Fastener System and Fastener for Shipping Containers and the Like" issued to Sadri et al., assigned to the same assignee as the present invention and incorporated herein by reference. This patent discloses an elongated pin having a head portion and a shank portion. The shank portion includes a set of helical splines to engage a bore in a tubular collar. As the collar is pressed onto the pin, the splines flow the collar material into grooves associated with the splines to provide an interference engagement between the two. To keep the splines from significantly expanding the collar radially as it is pressed onto the pin, the degree of interference between the splines and the bore and the relative hardness of the pin to the collar are controlled. In the disclosed preferred embodiment, the pin has been heat-treated and has a hardness of approximately two times the hardness of the collar.

Another example of such a fastener can be seen in U.S. Pat. No. 4,627,775, "Blind Fastener with Grip Compensating Means", issued to Dixon, assigned to the same assignee as the present invention and incorporated herein by reference. This patent discloses a blind fastener including an elongated pin and a tubular collar. The pin includes a single forming or extruding land having a diameter that is larger than an inner diameter of the collar. As the collar is pressed onto the pin, the extruding portion extrudes a portion of the collar material into a lock groove associated with the extruding land to lock the collar to the pin. This operation also results in the radial expansion of the collar due to the force from the extruding land. In one embodiment disclosed, the pin has been heat-treated to a hardness of $R_c$ 48–52.

SUMMARY OF THE INVENTION

The present invention provides a fastener for fastening multiple workpieces (or multilaminate workpiece) together. The fastener includes a pin and a collar for engaging the pin. The pin includes a pin head for engaging one exposed surface of the workpieces and a pin shank for positioning through a bore in the workpieces. The pin shank includes, sequentially moving away from the pin head, a shoulder, a second working surface having a second working edge with a second outer diameter, a second locking groove having an inner diameter less than the second outer diameter, a first working surface having a first working edge with a first outer diameter, a first locking groove having an inner diameter less than the first outer diameter, a breakneck groove and a pin tail having a plurality of pulling grooves. The collar includes an enlarged head and a through bore.

The collar is placed over the pin shank and an installation tool is used to grip the pulling grooves. The installation tool presses the collar onto the pin. As this happens, the first working edge engages the through bore of the collar and moves material from the through bore into the first locking groove to create a lock between the collar and the pin. Continued movement of the collar with respect to the pin engages the second working edge with the through bore of the collar and moves material from the through bore into the second locking groove to create an additional lock between the collar and the pin.

In one embodiment, the outer diameter of the second working edge is greater than the outer diameter of the first working edge so that the second working edge engages collar material not engaged by the first working edge. Alternatively, or in conjunction with the first embodiment, the first working edge can be provided with a non-round cross-section so that it only engages selected arcuate sections of the collar through bore. The second working edge is also provided with a non-round cross-section, rotated with respect to the first working edge cross-section so that the second working edge engages different arcuate sections of the collar through bore than the first working edge engages.

It is preferred that the proportions and positioning of the working surfaces, working edges, locking grooves and collar through bore be set such that as the first locking groove fills with collar material and a push-out value resulting from the lock of the first locking groove stops increasing, the push-out value resulting from the lock of the second locking groove continues to increase. This staging by use of the multiple working edges and locking grooves helps maximize the push-out value of the fastener over a broader clamping range than the use of only one such working edge/locking groove combination. Additional working edge/locking groove combinations can also be utilized. As the workpieces become firmly clamped between the pin and the collar, additional application of force by the installation tool will break off the pin tail at the breakneck groove.

The present invention can also be utilized with blind-type fasteners.

The use of the staged locking system described above also allows the use of a pin that has only been hardened through the working process and does not require additional heat-treating.

It is therefore an object of the present invention to provide a staged fastening system that maximizes the gripping force of the fastening system over a broad clamping range.

It is a further object of the present invention to provide a fastener having an increased resistance to pin push-out and loss of clamp loads over extended periods of use.

It is a further object of the present invention to provide a pin and collar type fastener where the pin needs no additional hardening beyond the work-hardening imparted by the pin manufacturing process.

It is a further object of the present invention to provide a fastener especially adapted for manufacturing shipping containers and the like having multilaminate constructions.

The foregoing and other objects, features, characteristics and advantages of the present invention as well as the methods of operation and functions of the related elements of structure, and the combination of parts and economies of manufacture, will be apparent from the following detailed description and the appended claims, taken in connection with the accompanying drawings, all of which form a part of the specification, wherein like reference numerals designate corresponding parts in the various figures.

BRIEF DESCRIPTION OF THE DRAWINGS

FIG. 1 is a side elevational view of the fastener of the present invention;

FIGS. 2a–2f are sectional views along section line 2—2 in FIG. 1 of alternative embodiments of the internal bore of the collar of the present invention;

FIG. 3a is partial sectional view of the fastener of the present invention installed on a workpiece;

FIG. 4 is an enlarged partial view of the locking groove of the fastener of the present invention;

FIG. 5 is an enlarged partial view of the locking groove of an alternative embodiment of the fastener of the present invention;

FIG. 6 is an end of an alternative embodiment of the pin of the present invention;

FIG. 7 is a partial sectional view of an blind-type embodiment of the fastener of the present invention positioned in a workpiece;

FIG. 8 is a partial sectional view of the embodiment of FIG. 7 after installation in the workpiece;

FIG. 9 is a partial side elevational view of an alternative embodiment of the pin of the present invention;

FIG. 12 is a graph of the tensile force required to pull apart various fasteners.

DETAILED DESCRIPTION OF THE INVENTION

Figure 10:
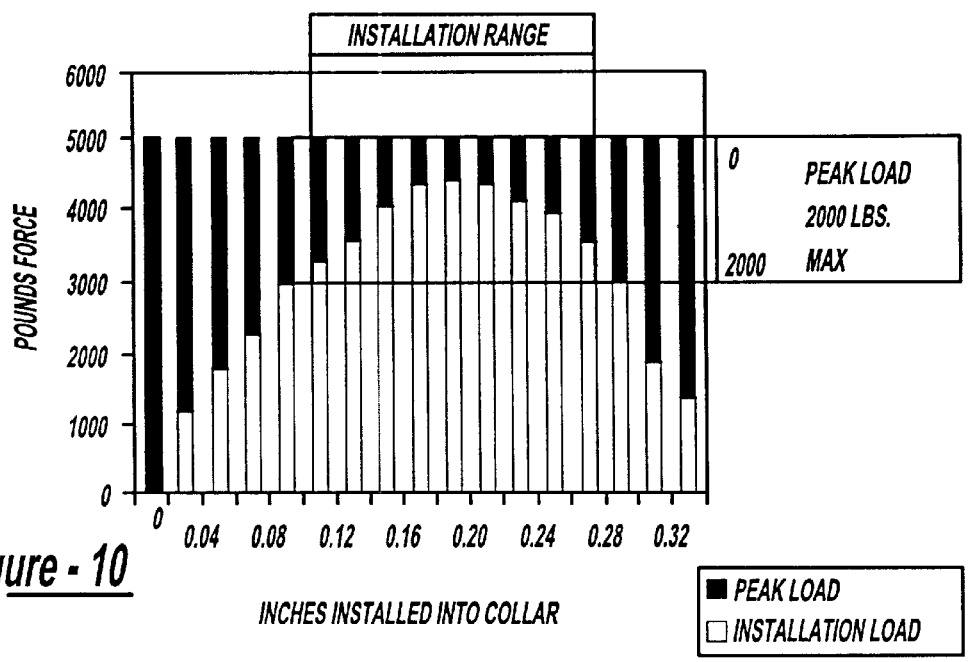
FIG. 10 is a graph showing the force to install the fastener of the present invention without a stop shoulder.

As can be seen in FIG. 1, the fastener 10 of the present invention includes an elongated pin 12 and a collar 14. The pin 12 includes a head 16 and an elongated shank 18. The elongated shank includes a first portion 20 having an appropriate diameter for properly positioning the pin 12 in a bore in a workpiece. See, for instance, FIG. 3 which shows the fastener 12 positioned in a bore 100 of a multi-laminate workpiece 102. The diameter of portion 20 is enlarged with respect to the rest of elongated shank 18 in the shear plane to resist catastrophic shear failure.

The elongated shank 18 also includes, in order of progression away from the head 16, a second working portion 22 having a working edge 24, a second locking groove 26, a first working portion 28 having a working edge 30 and a first locking groove 32. Continuing on, the elongated shank 18 includes a locating portion 34 for approximately positioning and centering the collar 14 as it is pressed onto the pin 12 during assembly of the fastener 10, a reduced diameter breakneck groove 36 and a pintail portion 38. Pintail portion 38 includes a plurality of pulling grooves 40 for engagement with a conventional installation tool (not shown). A diameter of the second working portion 22 is larger than a diameter of the first working portion 28 which is larger than a diameter of the locating portion 34. Although in the preferred embodiment the pin 12 has a round cross-section, in an alternative embodiment the cross-section can be square, triangular or of another shape.

Collar 14 includes a head 42 connected to a tubular body 44 and an internal bore 46 running therethrough generally concentric to a longitudinal axis of the collar 14. In the presently preferred embodiment, the bore 46 has a hexagonal cross-section, as can be seen in FIG. 2a. As seen in FIGS. 2b–2e, the bore 46 can also be provided with other shapes of cross-sections, to alter the amount and location of metal flow when the collar 14 is installed on the pin 12.

In the presently preferred embodiment, the pin 12 is made of a macro-alloyed steel that exhibits hardening under cold working. Thus, as the pin is manufactured by heading and cold rolling, the pin will harden to a desired hardness without further need for heat-treating. In the presently preferred embodiment, the pin is made of 1541 macro-alloyed steel and has a hardness of approximately $R_c$ 26–30 after heading and a hardness of approximately $R_c$ 28–32 after rolling. Of course, if a higher hardness is required, the pin can also be heat-treated. In the presently preferred embodiment, the collar is forged or stamped from 1010 carbon steel and is not heat-treated. Different materials can also be used for the pin and collar and, if necessary, the pin and/or collar can be heat-treated.

The operation of the fastener will now be described. The pin 12 is installed in bore 100 of workpiece 102. The collar 14 is then placed over the pintail portion 38 of pin 12. A known type of installation tool (not shown) is applied over the pintail 38. Activation of the tool causes the tool to grip the pulling grooves 40 and force collar 14 against the working edge 30 of first working portion 28. Continued movement of the collar 14 by the tool causes working edge 30 to cut material from bore 46 of collar 14 and cold-flow this cut material into the first locking groove 32. As installation continues, the working edge 24 of second working portion 22 contacts the collar 14. Since the second working portion 22 is larger in diameter than the first working portion 28, continued movement of the collar 14 causes working edge 24 to also cut material from bore 46 and cold-flow this material into the second locking groove 26.

Each of the locking grooves is shaped to prevent reverse movement of the collar 14 with respect to the pin 12. As can best be seen in FIG. 4, an enlarged view of locking groove 32, the groove has a trough portion 50 and a tapered wall 52. As material is cold flowed into the locking groove 32 upon installation of the collar 14, the material first fills the trough portion 50 and then engages the tapered wall 52. This engagement of the flowed material with tapered wall 52 prevents reverse movement of the collar 14 with respect to the pin 12 when the locking groove 32 is only partially filled. In comparison, a groove that had a basically rectangular cross-section could undesirably allow the collar 14 to be withdrawn from the pin 12 some part of the width of the groove when the groove is not filled. Although not presently preferred, one or more of the locking grooves can have an alternative shape than the shape shown in FIG. 4.

Since the first working portion 28 will travel farther within the bore 46 than second working portion 22 as the collar 14 is installed on pin 12, more material from collar 14 will be cut by the first working portion 28 than the second working portion 22. Thus, more material from collar 14 will be cold-flowed into first locking groove 32 than into second locking groove 26. In the presently preferred embodiment, the proportions and positioning of the working portions, working edges and locking grooves are set such that as the first locking groove becomes completely filled and its push-out value stops increasing, the second locking groove continues to be filled so that its push-out value continues to increase.

The installation process continues until the workpiece has been tightly clamped between the pin head 16 and the collar 14. At this point, the increased force necessary to move the collar any farther with respect to the pin will cause the pintail 38 to fracture at the breakneck groove 36, thereby releasing the installation tool from the fastener. Pin 12 also includes a shoulder 54 to provide a minimum clamping thickness of fastener 10 if the breakneck does not previously break. If the collar 14 moves so far along pin 12 that it contacts shoulder 54, the shoulder provides a positive stop for the collar 14 such that additional force applied between the pin 12 and the collar 14 by the installation tool will cause the pintail to break off at the breakneck groove 36. Such use of the shoulder 54 is not expected in normal use, but rather, in situations where the pin is operating in a minimum grip condition due to undersized workpieces or because of crushing of the workpieces.

See FIG. 10 which is a graph of the pounds force (LBF) needed to install the fastener (where pin 12 does not have a stop shoulder 54). It takes roughly 5000 pounds force to break the breakneck groove 36. This is shown as the horizontal line at 5000 LBF. The curve shows the force needed to install the pin the given distance into the collar. The force that the FRP workpiece encounters is the delta between the curve and the breakneck line. If the force that the FRP workpiece encounters exceeds roughly 2000 LBF, the FRP will begin to crush. Thus, it is important to try to prevent this force from exceeding 2000 LBF.

There is roughly 0.125" of slack between initial installation of the collar on the pin before compression of the FRP begins. This is shown as the curve begins its steep initial ascent. At roughly 0.190" installation depth, the curve is at its peak, whereby the majority of the force to install the fastener is being used to push the collar onto the pin and cut the material into the locking grooves. At this point, the FRP is only encountering a force of about 500 LBF. In a preferred installation the force to install the fastener will exceed the breakneck force at some point as the curve is still ascending or leveling.

Figure 11:
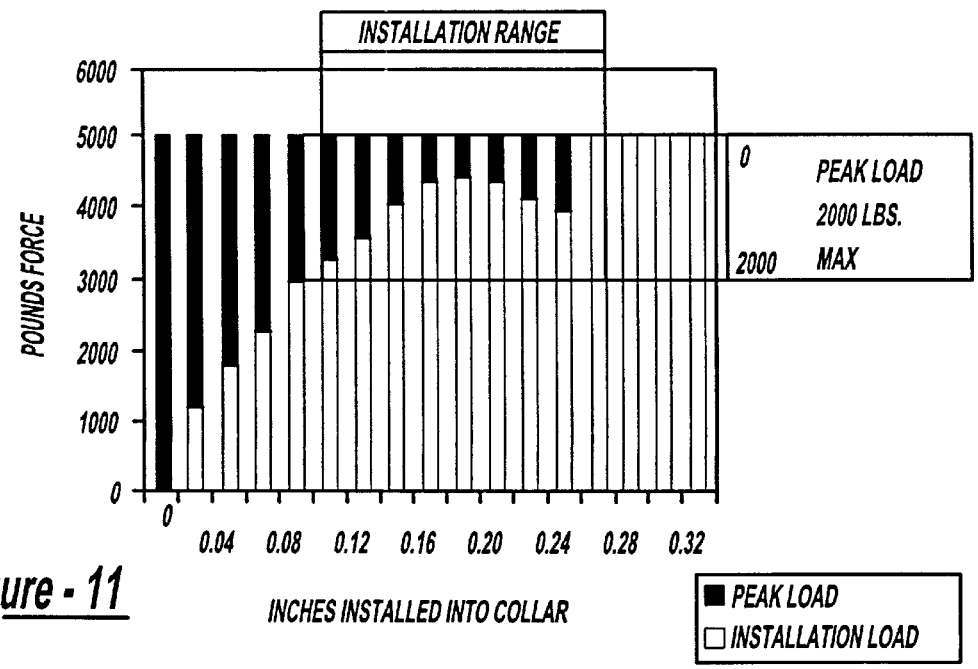
FIG. 11 is a graph showing the force to install the fastener of the present invention having a stop shoulder.

However, under certain circumstances (thin FRP, long fastener, voids in FRP), the breakneck will not break by this point and the curve will begin to descend due to packing of the locking grooves, whereby the force the FRP encounters starts to climb. If the breakneck has not broken at this point, it will not likely do so before the force the FRP encounters becomes large enough to start crushing of the FRP. In the example shown in FIG. 10, the curve never reaches the breakneck force. Thus, in the example shown in FIG. 10, if the breakneck has not broken by the time the collar reaches an installation depth of roughly 0.310", the FRP is encountering a force of approximately 3000 LBF, which will likely cause crushing of the FRP. As seen in FIG. 11, use of the shoulder 54 can force the curve to spike at roughly 0.250" installation depth so the force to install the fastener spikes to 5000 LBF and the breakneck fractures before the FRP encounters a crushing load, as might occur without the shoulder.

The use of multiple cutting surfaces and locking grooves helps maximize the push-out value of the fastener over a broader clamping range than the use of only one such working edge/locking groove combination. See FIG. 12 which shows a graph of the tensile force required to pull the fastener apart versus the depth of installation of the collar on the pin. As can be seen in the graph, the peak tensile force of a fastener having only one locking groove peaks at roughly 0.200" and then begins to descend. A second curve is shown (1+1) which merely takes the first curve and adds to it the magnitude of the first curve again, but delayed by approximately 0.100" (the distance between the working edges) to simulate what an actual two groove curve might look like.

The use of the two locking grooves of the present invention is shown by the solid line of the third curve. It can be seen that the minimum tensile force required to pull the two groove fastener apart stays at roughly the maximum tensile force of the single groove fastener or above until at least approximately 0.300" installation depth. Thus, the fastener of the present invention maintains a minimum tensile strength over a broader clamping range as compared to a single locking groove fastener. The peaks and valleys of the second curve after 0.200" are believed to be caused by the progressive effect of packing and then overpacking of first the first locking groove and then the second locking groove.

Although only two working edge/locking groove combinations are shown in the preferred embodiment, additional working edge/locking groove combinations can also be utilized. The proportions and positioning of the working surfaces and locking grooves are preferably set such that as the push-out value of one locking groove stops increasing, the push-out value for the next locking groove is still increasing to maintain an overall push-out value for the fastener above a desired minimum level over a predetermined clamping range. FIG. 9 shows such an embodiment of a pin having three working surfaces. In addition to the structure discussed above, the pin of FIG. 9 includes a third working portion 23, a third working edge 25 and a third locking groove 27.

In the presently preferred embodiment, the locating portion 34 has an outer diameter of 0.238", the first working portion 28 has an outer diameter of 0.248", the second working portion 22 has an outer diameter of 0.258" and the first portion 20 of elongated shank 18 has an outer diameter of 0.390" for fitting a bore having a diameter of 0.402". The length between the first working edge 30 and the second working edge 24 is 0.100". The distance between the second working edge 24 and the bottom of pin head 16 can be varied depending on the desired grip range but is presently preferred to be set alternatively at 0.451", 0.513", 0.575", 0.630" or 0.700". Trough portion 50 of locking groove 32 has a radius of 0.010" smoothly flowing into tapered wall 52 and a back wall 53 connecting the trough and working edge 30. The tapered wall 52 tapers toward the pintail 38 and is set at an angle of 75° from a plane perpendicular to the horizontal and intersecting the center of radius of the trough. The back wall 53 tapers slightly toward the pin head 16 and is set at an angle of 5° from the plane perpendicular to the horizontal and intersecting the center of radius of the trough. Correspondingly, the trough portion of locking groove 26 has a radius of 0.010", the tapered wall is set at an angle of 57° from a perpendicular plane toward the pintail 38 and the back wall is set an angle of 5° from the perpendicular plane toward the pin head 16. The center of radius for each trough is set at a depth of 0.012" in from the outer diameter of second working surface 22. The distance between opposing flats of bore 46 as shown in FIG. 2a is presently preferred to be 0.236".

Although the preferred embodiment utilizes working edges that cut the material from collar 14, it is also contemplated that working edges can be utilized that extrude the material instead of cutting it. FIG. 5 shows such a working edge 130 extruding and cold-flowing material from collar 14. Such extruding working edges can be utilized alone on the fastener 10 or in combination with cutting working edges. Further, although the presently preferred embodiment has a second working edge 24 having a diameter larger than the first working edge 30, it is also contemplated that the invention encompass an embodiment where the working edges are not round in cross-section and are adapted to engage different circumferential sectors of bore 46 such that the diameters of the two working edges can be the same, or even that the second working edge diameter is smaller than the first working edge diameter.

For instance, as shown in FIG. 6, the first working edge 30' can be provided with a tri-lobed cross-section such that it engages the bore 46 at three circumferential sectors of through bore 46 and the second working edge 24' is also provided with a tri-lobed cross-section rotated with respect to the first tri-lobed cross-section such that it engages the three different circumferential sectors of bore 46. In such an embodiment, where the first and second working edges are engaging different portions of bore 46, it is not required to have the diameter of the second working edge greater than the diameter of the first working edge. It is also presently preferred with such an embodiment to use a collar having a round through bore 46, as shown in FIG. 2f, since then there is no requirement to provide an angular alignment of collar bore structures with respect to the lobes of the pin.

As discussed above, bore 46 can be provided with different cross-sections. In FIG. 2b, the bore 46 is shown as having four wider raised lands 60 which will contact and work in conjunction with the working surfaces of pin 12. FIG. 2c shows a similar configuration with four narrower raised lands 62. FIG. 2d shows a configuration with seven narrower raised lands 64. FIG. 2e shows a modified hexagonal configuration with each hex side 66 having a curved recession 68. Further, although the presently preferred embodiment shows collar 14 having a tubular body 44 adapted to engage the working edges while within bore 100 in workpiece 102, it is also contemplated that the invention encompass an embodiment where the collar has only a head portion and does not have a tubular body portion adapted to enter bore 100. In such an embodiment, the working edges would engage a through bore in the head portion of the collar external to bore 100.

If desired, an elastomeric seal 56 can be provided between head 16 and/or collar 14 and workpiece 102 to provide a sealed connection between the fastener 10 and the workpiece 102.

The present invention can also be utilized in conjunction with a blind-type fastener, as disclosed in the Dixon '775 or Sadri '611 patents discussed above and incorporated by reference herein. For instance, see FIGS. 7 and 8 which show a blind-type fastener in accordance with the present invention, generally indicated at 110. The fastener 110 includes a pin 112 and a collar 114. The pin 112 includes an enlarged head 116 and an elongated shank 118. The collar 114 includes a head 142 connected to a tubular sleeve 144 and having an internal bore 146 running therethrough generally concentric to a longitudinal axis of the collar 114. The bore 146 has a rearward portion 180 having a first diameter and a forward portion 182 having a second diameter. The remaining structure is similar to the embodiments discussed above.

The collar 114 is adapted to fit over pin 112. The outer diameter of the pin head 116 is similar to or slightly less than the outer diameter of the tubular sleeve 144. Therefore, both the pin 112 and the collar 114 can be passed through a bore 200 in workpiece 202 from one side of the workpiece. The diameter of forward portion 182 of the bore 146 is large enough to pass over the elongated shank when the collar 114 is assembled onto pin 112. However, the diameter of the rearward portion 180 is sized to engage the working portions of the pin, as discussed above with respect to the previous embodiments.

The fastener 110 can be installed in a blind mode, i.e., from one side of workpiece 202. The fastener is set by the application of a relative axial force between the pin 112 and the collar 114 by an installation tool as previously discussed.

During installation, as the movement of pin 112 continues, the pin head 116 engages the end of collar sleeve 144 and attempts to move into bore 146. As it does so, the pin head 116 expands an end portion 184 of tubular sleeve 144 and continues to enter the bore 146. This operation forms the end portion 184 into a tulip-shaped portion 186 as the pin head continues into bore 146, expanding the end portion as it goes. The tulip-shaped portion 186 engages the workpiece 202 and continues to expand until the fastener 110 is drawn tight against the workpiece 202. Continued application of the axial force by the installation tool will be countered by the tightening of the fastener 110 against workpiece 202 until the force is sufficient to break the pintail at the breakneck groove. The installed blind-type fastener can be seen in FIG. 8. The different configurations, constructions and options discussed above with respect to the non-blind embodiments can be equally applied to the blind-type embodiments as well.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A fastener for securing a plurality of workpieces having aligned openings, the workpieces to be secured having a first surface and an opposite second surface, said fastener comprising:

a hollow collar having a through bore;

said collar having an enlarged collar head, said collar head adapted to engage the first surface of the workpieces, a pin, said pin having an enlarged pin head adapted to engage the second surface of the workpieces and having a shank portion adapted to be positioned through the aligned openings of the workpieces to engage said through bore of said collar, said pin shank having a first working surface and a first working edge having a first outer diameter, said pin shank having a second working surface and a second working edge having a second outer diameter larger than said first outer diameter, said second working edge being positioned closer to said pin head than said first working edge, said pin shank further having a first locking groove connected to said first working edge and distal from said pin head, said first locking groove having an inner diameter smaller than said first outer diameter, said pin shank also having a second locking groove connected to said second working edge and distal from said pin head, said second locking groove having an inner diameter smaller than said second outer diameter, said first and second working edges having a diameter greater than the undeformed diameter of said through bore, said first working edge being engageable with said through bore of said collar to deform material from said through bore into said first locking groove as said pin is moved to said through bore to form a lock between said pin and said collar, said second working edge being subsequently engageable with said through bore of said collar to deform material from said through bore into said second locking groove as said pin is moved further into said through bore to form an additional lock between said pin and said collar, said first and second working surfaces being integrally formed on said pin shank and with said first and second working edges being axially separated a preselected distance whereby upon completion of the installation of the fastener both said first and second working edges are in said trough bore of said collar at positions axially spaced from the opposite second surface of the workpieces.

2. The fastener of claim 1 wherein at least one of the locking grooves has a trough portion adjacent its associated working edge, said trough portion having an inner diameter, said one locking groove further having a wall connected to said trough portion on a side of said trough portion distant from the working edge, said wall tapering radially outward from said trough portion toward an outer diameter of said one locking groove as said wall becomes more distant from the working edge such that material deformed from said through bore of said collar into said one locking groove will engage said tapering wall and provide a lock between said collar and said pin even if said one locking groove is not full of the collar material.

3. The fastener of claim 1, wherein at least one of the working edges cuts material from said through bore of said collar to deform the material into its associated locking groove.

4. The fastener of claim 1, wherein at least one of the working edges extrudes material from said through bore of said collar to deform the material into its associated locking groove.

5. The fastener of claim 1, wherein said pin shank further comprises:
   a third working surface and a third working edge having a third outer diameter larger than said second outer diameter, said third working edge being positioned closer to said pin head than said second working edge, said pin shank further having a third locking groove connected to said third working edge and distal from said pin head, said third locking groove having an inner diameter smaller than said third outer diameter, said third working edge being engageable with said through bore of said collar to deform material from said through bore into said third locking groove as said pin is moved further into said through bore to form a lock between said pin and said collar.

6. The fastener of claim 1, wherein said pin shank further comprises a breakneck groove providing a weakened section in said pin shank and a pin tail opposite said breakneck groove with respect to said pin head, said pin tail having a pulling portion adapted to be gripped by an installation tool for applying a relative axial force between said pin and said collar to set the fastener, whereby a sufficient additional force applied between said pin tail and said collar by the installation tool will break said pin shank at said breakneck groove, separating said pin tail from said pin shank at the completion of the installation of the fastener.

7. The fastener of claim 6, wherein said pin shank further comprises a stop shoulder adapted to engage said collar and stop movement of said collar with respect to said pin to ensure that the force exerted between said pin and said collar by the installation tool will rise to a sufficient level to break off said pin tail.

8. The fastener of claim 1, wherein said through bore of said collar has a hexagonal cross-section.

9. The fastener of claim 1, wherein said through bore of said collar has a cross-section having a plurality of evenly spaced raised lands where the circumferential width of each raised land is greater than the circumferential distance between each raised land.

10. The fastener of claim 1, wherein said through bore of said collar has a cross-section having a plurality of evenly spaced raised lands where the circumferential width of each raised land is less than the circumferential distance between each raised land.

11. The fastener of claim 1, wherein said through bore of said collar has a generally hexagonal cross-section defining a plurality of circumferentially extending hexagonal faces with an arcuate depression provided in a center of each of said hexagonal faces.

12. The fastener of claim 1, and further comprising at least one seal disposed in contact with one of said collar and said pin head to provide a sealing relationship between the fastener and the workpieces.

13. The fastener of claim 1, wherein said collar includes a tubular body portion adjacent said enlarged collar head and adapted to be positioned within the aligned openings of the workpieces when the fastener is installed.

14. The fastener of claim 1, wherein as said first locking groove is filled with material from said through bore of said collar such that a push-out value resulting from the lock of said first locking groove is no longer increasing, a push-out value resulting from the lock of the second locking groove is continuing to increase.

15. A fastener for securing a plurality of workpieces having aligned openings, the workpieces to be secured having a first surface and an opposite second surface, said fastener comprising:
   a hollow collar having a through bore;
   said collar having an enlarged collar head, said collar head adapted to engage the first surface of the workpieces,
   a pin,
   said pin having an enlarged pin head adapted to engage the second surface of the workpieces and a shank portion adapted to be positioned through the aligned openings of the workpieces to engage said through bore of said collar,
   said pin shank having a first working surface and a first working edge having a first outer diameter, said pin shank having a second working surface and a second working edge having a second outer diameter, said second working edge being positioned closer to said pin head than said first working edge, said pin shank further having a first locking groove connected to said first working edge and distal from said pin head, said first locking groove having an inner diameter smaller than said first outer diameter, said pin shank also having a second locking groove connected to said second working edge and distal from said pin head, said second locking groove having an inner diameter smaller than said second outer diameter,
   said first and second working edges having a diameter greater than the undeformed diameter of said through bore,
   said first working edge being engageable with at least one selected arcuate portion of said through bore of said collar to deform material from said through bore into said first locking groove as said pin is moved into said through bore to form a lock between said pin and said collar, said second working edge being subsequently engageable with at least one arcuate section of said through bore of said collar different from said at least fine arcuate section engaged by said first working edge to deform material from said through bore of said collar into said second locking groove as said pin is moved further into said through bore to form an additional lock between said pin and said collar, said first and second working surfaces being integrally formed on said pin shank and with said first and second working edges being axially separated a preselected distance whereby upon completion of the installation of the fastener both said first and second working edges are in said through bore of said collar at positions axially spaced from the opposite second surface of the workpieces.

16. The fastener of claim 15, wherein at least one of the locking grooves has a trough portion adjacent its associated working edge, said trough portion having an inner diameter, said on locking groove further having a wall connected to said trough portion on a side of said trough portion distant from the working edge, said wall tapering radially outward from said trough portion toward an outer diameter of said one locking groove as said wall becomes more distant from the working edge such that material deformed from said collar into said one locking groove will engage said tapering wall and provide a lock between said through bore of said collar and said pin even if said one locking groove is not full of said collar material.

17. The fastener of claim 15, wherein at least one of the working edges cuts material from said through bore of said collar to deform the material into its associated locking groove.

18. The fastener of claim 15, wherein at least one of the working edges extrudes material from said through bore of said collar to deform the material into its associated locking groove.

19. The fastener of claim 15, wherein said pin shank further comprises:
a third working surface and a third working edge having a third outer diameter larger than said second outer diameter, said third working edge being positioned closer to said pin head than said second working edge, said pin shank further having a third locking groove connected to said third working edge and distal from said pin head, said third locking groove having an inner diameter smaller than said third outer diameter, said third working edge being engageable with said through bore of said collar to deform material from said through bore into said third locking groove as said pin is moved further into through bore to form a lock between said pin and said collar.

20. The fastener of claim 15, wherein said pin shank further comprises a breakneck groove for providing a weakened section in said pin shank and a pin tail opposite said breakneck groove with respect to said pin head, said pin tail having a pulling portion adapted to be gripped by an installation tool for applying a relative axial force between said pin and said collar to set the fastener, whereby a sufficient additional force applied between said pin tail and said collar by the installation tool will break said pin shank at said breakneck groove, separating said pin tail from said pin shank at the completion of the installation of the fastener.

21. The fastener of claim 20, wherein said pin shank further comprises a stop shoulder adapted to engage said collar and stop movement of said collar with respect to said pin to ensure that the force exerted between said pin and said collar by the installation tool will rise to a sufficient level to break off said pin tail.

22. The fastener of claim 15, wherein the circumferential cross-section of said first working edge is polygonal.

23. The fastener of claim 22, wherein the circumferential cross-section of said second working edge is of a similar shape as said first working edge but with the shape circumferentially rotated with respect to the shape of said first working edge.

24. The fastener of claim 15, and further comprising at least one seal disposed in contact with one of said collar and said pin head to provide a sealing relationship between the fastener and the workpieces.

25. The fastener of claim 15, wherein said collar includes a tubular body portion adjacent said enlarged collar head and adapted to be positioned within the aligned openings of the workpieces when the fastener is installed.

26. The fastener of claim 15, wherein as said first locking groove is filled with material from said through bore of said collar such that a push-out value resulting from the lock of said first locking groove is no longer increasing, a push-out value resulting from the lock of said second locking groove is continuing to increase.

27. A blind-type fastener for securing a plurality of workpieces having aligned openings, the workpieces to be secured having a first surface and an opposite second surface, said fastener comprising:
a hollow collar having a through bore;
said collar having a tubular body portion with an enlarged collar head at one end and an expandable portion at another end, said collar head being engageable with the first surface of the workpieces,
a pin,
said pin having a pin head being engageable with said expandable portion of said tubular body portion to form a blind head and having a shank portion adapted to be positioned in the aligned openings of the workpieces to engage said through bore of said collar,
said expandable portion being operatively engageable with said pin head to be expanded to form said blind head to engage the second surface of the workpieces upon installation of the fastener,
said pin shank having a first working surface and a first working edge having a first outer diameter, said pin shank having a second working surface and a second working edge having a second outer diameter, said second working edge being positioned closer to said pin head than said first working edge, said pin shank further having a first locking groove connected to said first working edge and distal from said pin head, said first locking groove having an inner diameter smaller than said first outer diameter, said pin shank also having a second locking groove adjacent said second working edge and distal from said pin head, said second locking groove having an inner diameter smaller than said second outer diameter,
said first and second working edges having a diameter greater than the undeformed diameter of said through bore,
said first working edge being engageable with a portion of said through bore of said collar to deform material from said through bore into said first locking groove as said pin is moved into said through bore to form a lock between said pin and said collar, said second working edge being subsequently engageable with said through bore of said collar to deform material from said through bore into said second locking groove as said pin is moved further into said through bore to form an additional lock between said pin and said collar, said first and second working surfaces being integrally formed on said pin shank and with said first and second working edges being axially separated a preselected distance whereby upon completion of the installation of the fastener both said first and second working edges are in said through bore of said collar at positions axially spaced from the opposite second surface of the workpieces.

28. The fastener of claim 27, wherein at least one of the locking grooves has a trough portion adjacent its associated working edge, said trough portion having an inner diameter, said one locking groove further having a wall connected to said trough portion on a side of said trough portion distant from the working edge, said wall tapering radially outward from said trough portion toward an outer diameter of said one locking groove as said wall becomes more distant from the working edge such that material deformed from said through bore of said collar into said one locking groove will engage said tapering wall and provide a lock between said collar and said pin even if said one locking groove is not full of the collar material.

29. The fastener of claim 27, wherein at least one of the working edges cuts material from said through bore of said collar to deform the material into its associated locking groove.

30. The fastener of claim 27, wherein at least one of the working edges extrudes material from said through bore of said collar to deform the material into its associated locking groove.

31. The fastener of claim 27, wherein said pin shank further comprises:
a third working surface and a third working edge having a third outer diameter larger than said second outer diameter, said third working edge being positioned closer to said pin head than said second working edge, said pin shank further having a third locking groove connected with said third working edge and distal from said pin head, said third locking groove having an inner diameter smaller than said third outer diameter, said third working edge adapted to engage said through bore of said collar to deform material from said through bore into said third locking groove as said pin is moved further into said through bore to form a lock between said pin and said collar.

32. The fastener of claim 27, wherein said pin shank further comprises a breakneck groove for providing a weakened section in said pin shank and a pin tail opposite said breakneck groove with respect to said pin head, said pin tail having a pulling portion adapted to be gripped by an installation tool for applying a relative axial force between said pin and said collar to set the fastener, whereby a sufficient additional force applied between said pin tail and said collar by the installation tool will break said pin shank at said breakneck groove, separating said pin tail from said pin shank at the completion of the installation of the fastener.

33. The fastener of claim 32, wherein said pin shank further comprises a stop shoulder adapted to engage said collar and stop movement of said collar with respect to said pin to ensure that the force exerted between said pin and said collar by the installation tool will rise to a sufficient level to break off said pin tail.

34. The fastener of claim 27, wherein the circumferential cross-section of said first working edge is polygonal.

35. The fastener of claim 34, wherein the circumferential cross-section of said second working edge is of a similar shape as said first working edge but with the shape rotated circumferentially with respect to said first working edge.

36. The fastener of claim 27, and further comprising at least one seal in contact with one of said collar and said pin head to provide a sealing relationship between the fastener and the workpieces.

37. The fastener of claim 27, wherein as said first locking groove is filled with material from said through bore of said collar such that a push-out value resulting from the lock of said first locking groove is no longer increasing, a push-out value resulting from the lock of said second locking groove is continuing to increase.

38. The fastener of claim 27, wherein said second outer diameter of said second working edge is greater than said first outer diameter of said first working edge.

39. The fastener of claim 27, wherein said first working edge engages at least one arcuate portion of said through bore of said collar and said second working edge engages at least one arcuate portion of said through bore of said collar different from the at least one arcuate portion engaged by said first working edge.

40. A fastener for securing a plurality of workpieces having aligned openings, the workpieces to be secured having a first surface and an opposite second surface, said fastener comprising:
a hollow collar having a through bore;
said collar having a tubular body portion with an enlarged collar head at one end and an expandable portion at another end, said collar head being engageable with the first surface of the workpieces,
a pin,
said pin having a pin head being engageable with said expandable portion of said tubular body portion to expand it to form a blind head and a shank portion adapted to be positioned in the aligned openings of the workpieces to engage said through bore of said collar,
said expandable portion being operatively engageable with said pin head to be expanded to form said blind head to engage the second surface of the workpieces upon installation of the fastener,
said pin shank having a first working surface and a first working edge having a first outer diameter, said pin shank having a second working surface and a second working edge having a second outer diameter, said second working edge being positioned closer to said pin head than said first working edge, said pin shank further having a first locking groove adjacent said first working edge and distal from said pin head, said first locking groove having an inner diameter smaller than said first outer diameter, said pin shank also having a second locking groove adjacent said second working edge and distal from said pin head, said second locking groove having an inner diameter smaller than said second outer diameter,
said first and second working edges having a diameter greater than the undeformed diameter of said through bore,
said first working edge adapted to engage at least one selected arcuate portion of said through bore of said collar and deform material from said through bore into said first locking groove as said pin is moved into said through bore to form a lock between said pin and said collar, said second working edge being subsequently engageable with at least one arcuate section of said through bore of said collar different from the at least one arcuate section engaged by said first working edge to deform material from said through bore of said collar into said second locking groove as said pin is moved further into said through bore to form an additional lock between said pin and said collar, said first and second working surfaces being integrally formed on said pin shank and with said first and second working edges being axially separated a preselected distance whereby upon completion of the installation of the so fastener both said first and second working edges are in said through bore of said collar at positions axially spaced from the opposite second surface of the workpieces.

41. The fastener of claim 40, wherein at least one of the locking grooves has a trough portion adjacent its associated working edge, said trough portion having an inner diameter, said one locking groove further having a wall connected to said trough portion on a side of said trough portion distant from the working edge, said wall tapering radially outward from said trough portion toward an outer diameter of said one locking groove as said wall becomes more distant from the working edge such that material deformed from said through bore of said collar into said one locking groove will engage said tapering wall and provide a lock between said collar and said pin even if said one locking groove is not full of the collar material.

42. The fastener of claim 40, wherein at least one of the working edges cuts material from paid through bore of said collar to deform the material into its associated locking groove.

43. The fastener of claim 4, wherein at least one of the working edges extrudes material from said through bore of said collar to deform the material into its associated locking groove.

44. The fastener of claim 40, wherein said pin shank further comprises:
a third working surface and a third working edge having a third outer diameter larger than said second outer diameter,
said third working edge being positioned closer to said pin head than said second working edge, said pin shank further having a third locking groove connected with said third working edge and distal from said pin head, said third locking groove having an inner diameter smaller than said third outer diameter, said third working edge being engageable with said through bore of said collar to deform material from said through bore into said third locking groove as said pin is moved further into said through bore to form a lock between said pin and said collar.

45. The fastener of claim 40, wherein said pin shank further comprises a breakneck groove for providing a weakened section in said pin shank and a pin tail opposite said breakneck groove with respect to said pin head, said pin tail having a pulling portion adapted to be gripped by an installation tool for applying a relative axial force between said pin and said collar to set the fastener, whereby a sufficient additional force applied between said pin tail and said collar by the installation tool will break said pin shank at said breakneck groove, separating said pin tail from said pin shank at the completion of the installation of the fastener.

46. The fastener of claim 45, wherein said pin shank further comprises a stop shoulder engageable with said collar to stop movement of said collar with respect to said pin to ensure that the force exerted between said pin and said collar by the installation tool will rise to a sufficient level to break off said pin tail.

47. The fastener of claim 40, wherein the circumferential cross-section of said first working edge is polygonal.

48. The fastener of claim 47, wherein the circumferential cross-section of said second working edge is of a similar shape as said first working edge but with the shape circumferentially rotated with respect to the shape of said first working edge.

49. The fastener of claim 40, and further comprising at least one seal disposed in contact with one of said collar and said pin head to provide a sealing relationship between the fastener and the workpieces.

50. The fastener of claim 40, wherein as said first locking groove is filled with material from said through bore of said collar such that a push-out value resulting from the lock of said first locking groove is no longer increasing, a push-out value resulting from the lock of said second locking groove is continuing to increase.

51. A fastener for securing a plurality of workpieces having aligned openings, the workpieces to be secured having a first surface and an opposite second surface, said fastener comprising:
a hollow collar having a through bore;
said collar having an enlarged collar head, said collar head adapted to engage the first surface of the workpieces,
a pin,
said pin having a shank portion adapted to be positioned through the aligned openings of the workpieces to engage said through bore of said collar,
said pin having an integral enlarged pin head at one end of said shank portion,
said pin shank having a first working surface and a first working edge having a first outer diameters said pin shank having a second working surface and a second working edge having a second outer diameter, said second working edge being positioned closer to said pin head than said first working edge, said pin shank further having a first locking groove connected to said first working edge and distal from said pin head, said first locking groove having an inner diameter smaller than said first outer diameter, said pin shank also having a second locking groove connected to said second working edge and distal from said pin head, said second locking groove having an inner diameter smaller than said second outer diameter,
said first and second working edges having a diameter greater than the undeformed diameter of said through bore,
said working edge adapted to engage said through bore of said collar to deform material from said through bore into said first locking groove as said pin is moved into said through bore to form a lock between said pin and said collar, said second working edge adapted to subsequently engage said through bore of said collar to deform material from said through bore into said second locking groove as said pin is moved further into said through bore to form an additional lock between said pin and said collar, said first and second working surfaces being integrally formed on said pin shank and with said first and second working edges being axially separated a preselected distance whereby upon completion of the installation of the fastener both said first and second working edges are in said through bore of said collar at positions axially spaced from the opposite second surface of the workpieces.

52. The fastener of claim 51 wherein at least one of the locking grooves has a trough portion connected to its associated working edge, said trough portion having an inner diameter, said one locking groove further having a wall connected to said trough portion on a side of said through portion distant from the working edge, said wall tapering radially outward from said trough portion toward an outer diameter of said one locking groove as said wall becomes more distant from the working edge such that material deformed from said through bore of said collar into said one locking groove will engage said tapering wall and provide a lock between said collar and said pin even if said one locking groove is not full of the collar material.

53. The fastener of claim 51, wherein at least one of the working edges cuts material from said through bore of said collar to deform the material into its associated locking groove.

54. The fastener of claim 51, wherein at least one of the working edges extrudes material from said through bore of said collar to deform the material into its associated locking groove.

55. The fastener of claim 51, wherein said pin shank further comprises:

a third working surface and a third working edge having a third outer diameter larger than said second outer diameter, said third working edge being positioned closer to said pin head than said second working edge, said pin shank further having a third locking groove connected to said third working edge and distal from said pin head, said third locking groove having an inner diameter smaller than said third outer diameter, said third working edge being engageable with said through bore of said collar to deform material from said through bore into said third locking groove as said pin is moved further into said through bore to form a lock between said pin and said collar.

56. The fastener of claim 51 with said pin head adapted to engage the second surface of the workpieces.

57. The fastener of claim 51 with said collar having a tubular body portion with an expandable portion at the end opposite from said enlarged collar head of said collar, said pin head being engageable with said expandable portion to expand it to form a blind head of said collar, said blind head being disposed between said pin head and said collar head and being engageable with the second surface of the workpieces upon installation of the fastener.

58. The fastener of claim 51, wherein the circumferential cross-section of said first working edge is polygonal.

59. The fastener of claim 58, wherein the circumferential cross-section of said second working edge is of a similar shape as said working edge but with the shape circumferentially rotated with respect to the shape of said first working edge.

60. The fastener of claim 51, wherein said second outer diameter of said second working edge is larger than said first outer diameter of said first working edge.

\* \* \* \* \*

UNITED STATES PATENT AND TRADEMARK OFFICE
CERTIFICATE OF CORRECTION

PATENT NO. : 6,241,443 B1
DATED : June 5, 2001
INVENTOR(S) : Thomas Harbin and Robert J. Corbett It is certified that error appears in the above-identified patent and that said Letters Patent is hereby corrected as shown below:

Title page,
In the References Cited insert:

| | | |
|---|---|---|
| RE30,445 | 12/1980 | Ruhl |
| 2,531,048 | 11/1950 | Huck |
| 2,531,049 | 11/1950 | Huck |
| 2,804,798 | 9/1957 | Brilmyer |
| 2,955,505 | 10/1960 | Schuster |
| 3,025,730 | 3/1962 | Brilmyer et al |
| 3,038,626 | 6/1962 | Simmons |
| 3,057,246 | 10/1962 | Brilmyer |
| 3,094,017 | 6/1963 | Champoux et al |
| 3,122,050 | 2/1964 | Wenson |
| 3,215,024 | 11/1965 | Brilmyer et al |
| 3,196,529 | 7/1965 | Schwinghamer |
| 3,641,865 | 2/1972 | Swindt et al |
| 3,915,053 | 10/1975 | Ruhl |
| 4,233,879 | 11/1980 | Sigmund |
| 4,519,736 | 5/1985 | Sigmund |
| 4,627,775 | 12/1986 | Dixon |
| 4,846,611 | 7/1989 | Sadri et al |
| 4,943,196 | 7/1990 | Dahl |
| 5,314,281 | 5/1994 | Turlach et al |
| 5,320,465 | 6/1994 | Smith |
| 5,599,147 | 2/1997 | Luhm |

Column 3,
Line 4, after "end" insert -- view --.

Column 9, claim 1,
Line 2, "trough" should be -- through --.

Column 11, claim 16,
Line 9, "on" should be -- one --.

Column 11, claim 19,
Line 40, after "into" insert -- said --.

UNITED STATES PATENT AND TRADEMARK OFFICE
CERTIFICATE OF CORRECTION

PATENT NO.     : 6,241,443 B1
DATED          : June 5, 2001
INVENTOR(S)    : Thomas Harbin and Robert J. Corbett It is certified that error appears in the above-identified patent and that said Letters Patent is hereby corrected as shown below:

<u>Column 15, claim 42,</u>
Line 15, "paid" should be -- said --.

<u>Column 15, claim 43,</u>
Line 18, "4" should be -- 40 --.

<u>Column 16, claim 51,</u>
Line 34, after "said" insert -- first --.

<u>Column 16, claim 52,</u>
Line 55, "through" should be -- trough --.

Signed and Sealed this

Second Day of April, 2002

Attest:

*Attesting Officer*

JAMES E. ROGAN
*Director of the United States Patent and Trademark Office*